UNITED STATES PATENT OFFICE.

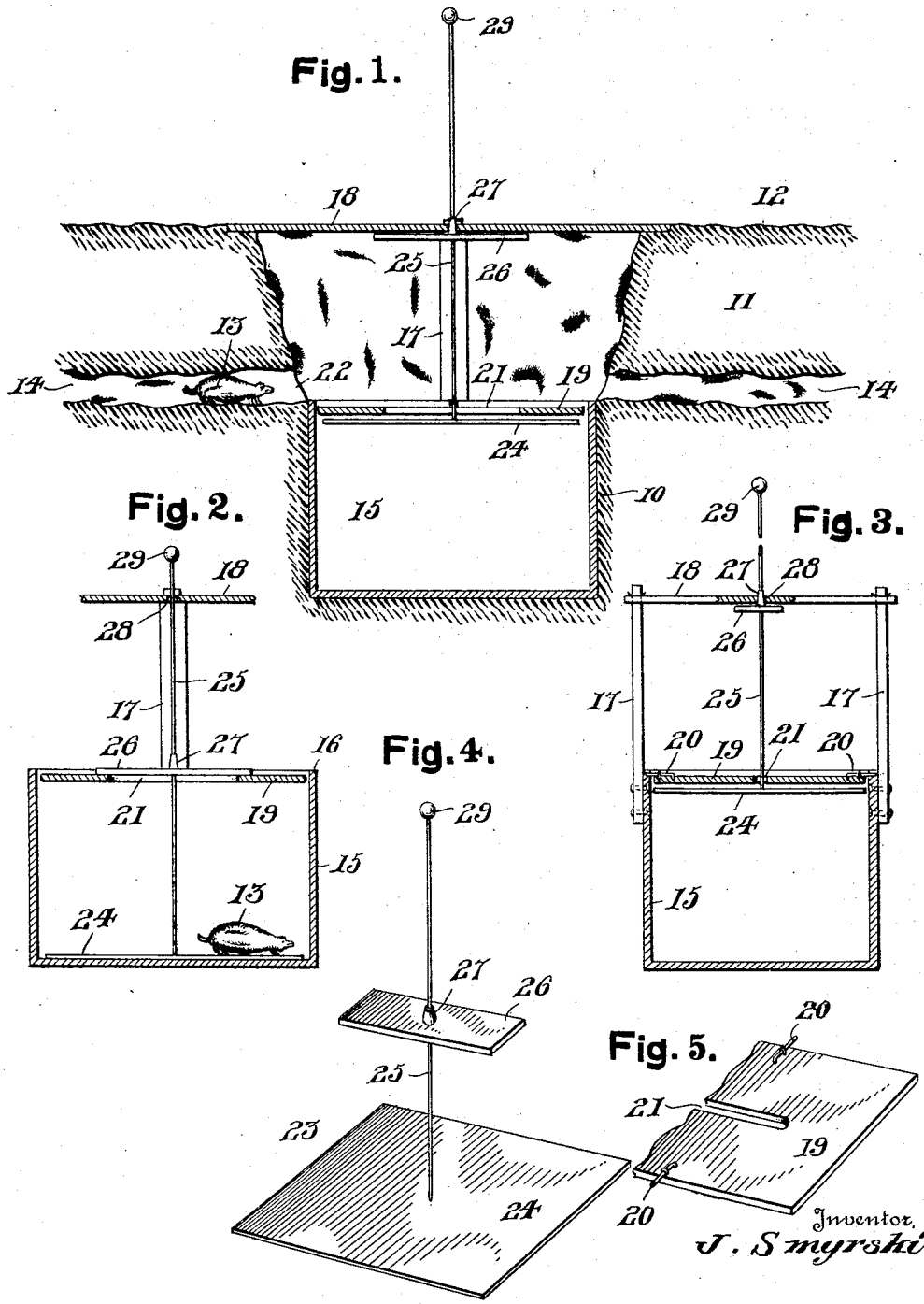

JAN SMYRSKI, OF PHILADELPHIA, PENNSYLVANIA.

ANIMAL-TRAP.

1,186,238.  Specification of Letters Patent.  Patented June 6, 1916.

Application filed December 14, 1915. Serial No. 66,760.

*To all whom it may concern:*

Be it known that I, JAN SMYRSKI, a subject of the Emperor of Austria-Hungary, residing at Philadelphia, in the county of Philadelphia and State of Pennsylvania, have invented certain new and useful Improvements in Animal-Traps, of which the following is a specification.

This invention relates to new and useful improvements in animal trap.

The primary object of the invention is the provision of an animal trap especially adapted for catching moles and other burrowing animals, at points beneath the surface of the ground, the animal being captured alive within the trap and removed from the earth with the latter.

A further object of the invention is the provision of an animal trap adapted to capture such animals as moles and squirrels beneath the ground and in a live condition, the same having an automatically operated trip arrangement whereby the animal is precipitated into a receiving cage and is prevented from escaping therefrom.

The present invention also designs a trap in which the release of a supported member operates a trip, the supporting member being released and thereafter receiving the weight of the captured animal which retains the trip against further movement and prevents the escape of the latter by reason of the weight of the animal.

With these general objects in view and others that will appear as the nature of the invention is better understood, the same consists in the novel combination and arrangement of parts hereinafter fully described, illustrated in the accompanying drawings and then claimed.

In the drawings forming a part of this application and in which like designating characters refer to corresponding parts throughout the several views:—Figure 1 is a vertical central sectional view through the device operatively positioned in the ground, the same being shown in its set condition. Fig. 2 is a similar view of the device removed from the ground and with parts broken away, the same being shown with a captured animal therein. Fig. 3 is a central transverse view of the device removed and in its set condition. Fig. 4 is a perspective view of the drop member of the device, and Fig. 5 is a perspective view of a portion of the trip member thereof detached.

It being understood that the present trap is primarily designed for employment for capturing burrowing animals, the same is herein illustrated in Fig. 1 as positioned within a hole 10 dug in the ground 11, the device being mainly positioned beneath the surface 12 of the latter and in such a position as to be serviceable in capturing an animal, such as the mole 13 illustrated within a substantially horizontally arranged burrow or passage 14 which is occupied by the animal.

The device consists of a box-like casing or cage 15 of a desired size and sunk within the hole 10 so that opposite upper edges 16 of the cage are positioned substantially flush with the bottom of the passage 14 at the interrupted portion thereof formed by digging the hole 10 vertically through the said passage transversely thereof.

Oppositely arranged posts 17 are carried by the cage 15 and are provided with a top or ground-board 18 secured to the tops of the said posts and adapted to be positioned flush with the surface of the ground 12 when the trap is operatively positioned as best illustrated in Fig. 1 of the drawings.

A trip board 19 is trunnioned by means of oppositely projecting pins 20 in the open top of the cage 10 substantially at the level of the edges 16 thereof and the bottom of the passage 14, the said trip board being provided with a central longitudinal slot 21, the board having its opposite swinging depressible ends adjacent the interrupted outlets or mouths 22 of the passage 14 at the opposite sides of the trap.

A drop member 23 of the form best illustrated in Fig. 4 of the drawings comprises a plate 24 of slightly less dimensions than the cage 15 and freely fitting therein. A suspension rod 25 is centrally secured to the plate 24 and is provided with a stop strip 26 secured substantially centrally thereof and arranged with a tapered stopper or conical wedge member 27 adapted for reception within a central perforation or socket 28 in the ground board 18, the said socket being correspondingly tapered so as to removably seat the wedge 27 therein.

From this detailed description of the device, the operation thereof will be described in connection with Fig. 1 of the drawings, it being evident that the animal 13 may freely walk upon the trip board 19 through the passage mouths 22 positioned at the opposite sides thereof. It will also be evident that if the trap is employed above the surface of the ground, that an animal might readily mount upon the trip 19 when the trap is in its set position as illustrated in both Figs. 1 and 3 of the drawings. The weight of the animal 13 upon the trip 19 causes the trip to tilt downwardly under the weight of the animal and upon coming in contact with the adjacent portion of the drop plate 24, downward movement will be imparted to the rod 25 which will forcibly withdraw the stopper wedge 27 from the perforation 28, thus allowing the weight of the plate 24 to precipitate the entire drop 23 downwardly until the plate 24 rests flatly upon the bottom of the cage 15 and the stop strip 26 flatly engages the top of the trip board 19, as best illustrated in Fig. 2 of the drawings, the strip 26 overlying and closing the trip slot 21. During the lowering movement of the plate 24, the animal passes from the trip 19 to the plate, and the rod 25 being attached to the plate and carrying the strip 26 being lowered with the plate, causes the strip to engage the upper end of the plate and move the same to the position shown in Fig. 2. The precipitation of the animal 13 off of the trip 19 and the downward movement of the plate 24 positions the animal 13 upon the said plate as illustrated in Fig. 2 of the drawings so that the weight of the animal then retains the plate 24 lowered with the strip 26 in engagement with the trip 19 to prevent any swinging movement thereof, while the weight of the drop 23 also retains the strip 26 upon the top of the trip 19, further preventing a tilting of the latter. With the drop 23 positioned at the bottom of the cage 15 and so retained by the weight of the animal, the strip 26 seals the opening 21 and prevents tilting of the trip 19 to retain the trapped animal.

A signal ball 29 is arranged upon the upper free end of the rod 25 and the position of the ball 29 when slightly spaced above the ground board 18 indicates that the trap has been sprung while the ball 29 is elevated to a considerably greater extent when the trap is set as illustrated in Fig. 1. The cage 15 may be forcibly removed from the hole 10 for removing the animal 13 therefrom.

A serviceable trap is thus arranged which is employable for capturing small animals either below or above the surface of the ground.

While the form of the invention herein shown and described is what is believed to be the preferred embodiment thereof, it is nevertheless to be understood that minor changes may be made in the form, proportion and details of construction without departing from the spirit and scope of the invention as hereinafter claimed.

What I claim as new is:—

1. A trap comprising a cage having an open top, a slotted trip board trunnioned in the top of said cage, a board supported above the said cage and having a tapered central perforation therein, a rod positioned through the slot of the said trip board and through the said perforation and having a signal ball on the upper free end thereof, a drop plate secured to the lower end of said rod and shiftably positioned within the cage, a stop strip secured to the said rod above the level of the said trip and a stopper wedge upon the said rod removably positioned within said perforation when the trap is in its set position with the plate underlying the said trip.

2. A trap comprising a box-shaped cage adapted for positioning within the ground and with the top edges thereof adjacent a burrow passage beneath the ground, oppositely arranged posts upon the said cage positioned laterally with respect to the said passage, a ground board upon the tops of the said posts positioned substantially level with the top of the ground and having a tapered receiving perforation centrally thereof, a drop for the said trap comprising a plate vertically shiftably positioned within the said cage, a rod centrally secured to the said plate and projecting through the said perforation, a trip provided with a centrally longitudinal slot and tiltably trunnioned in the open top of the said cage and having points of suspension adjacent the said posts, the said rod being freely positioned through the said slot, a stop strip carried by the said rod at a point between the said ground board and trip and positioned flatly upon said trip overlying the said slot when the trap is in its sprung condition with the said plate flatly engaging the bottom of said trap and a wedge carried by the said strip removably positioned within the said perforation.

3. An under ground animal trap comprising a cage, an animal actuating trip trunnioned in the open end thereof, a detachably suspended drop member having a portion thereof positioned in the path of movement of the said trip when the trap is set, and a stop strip carried by the said drop and restrainingly positioned upon the top of said trip when the trap is sprung.

4. An underground animal trap comprising a cage, an animal actuating trip trunnioned in the open end thereof, a detachably suspended drop member having a portion thereof positioned in the path of movement of the said trip when the trap is set, a stop strip carried by the said drop and restrainingly positioned upon the top of said trip when the trap is sprung, a surface board provided above the said trip and having a receiving perforation therein, a wedge carried by the said drop and removably positioned within the said perforation when the trap is set, and a signal ball carried by the said drop and positioned at different relative heights above the said ground board during the set and sprung conditions of the trap.

In testimony whereof I affix my signature.

JAN SMYRSKI.

Copies of this patent may be obtained for five cents each, by addressing the "Commissioner of Patents, Washington, D. C."